US006823235B2

United States Patent
Toyozawa et al.

(10) Patent No.: US 6,823,235 B2
(45) Date of Patent: Nov. 23, 2004

(54) CONTROLLER FOR MACHINING GEARS

(75) Inventors: Yukio Toyozawa, Kikuchi-gun (JP); Naoto Sonoda, Kamimashiki-gun (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/323,932

(22) Filed: Dec. 20, 2002

(65) Prior Publication Data

US 2003/0125831 A1 Jul. 3, 2003

(30) Foreign Application Priority Data

Dec. 27, 2001 (JP) .................................... 2001-395824

(51) Int. Cl.$^7$ .............................................. G06F 19/00
(52) U.S. Cl. ................................... 700/193; 318/632
(58) Field of Search ............................. 700/193, 170, 700/173, 191–192, 186; 318/632, 625, 628, 638

(56) References Cited

U.S. PATENT DOCUMENTS

| | | | |
|---|---|---|---|
| 3,911,347 A | | 10/1975 | Hartung |
| 4,007,361 A | * | 2/1977 | Martin ........................ 318/561 |
| 4,096,770 A | * | 6/1978 | Tanner ........................ 82/1.11 |
| 5,019,763 A | | 5/1991 | Komatsu |
| 5,021,941 A | * | 6/1991 | Ford et al. .................... 700/71 |
| 5,189,627 A | * | 2/1993 | Momochi et al. ........... 700/189 |
| 5,539,172 A | * | 7/1996 | Takase et al. ............... 219/69.2 |
| 6,046,566 A | * | 4/2000 | Sonoda et al. .............. 318/625 |

FOREIGN PATENT DOCUMENTS

| | | |
|---|---|---|
| DE | 2 359 817 | 7/1974 |
| EP | 0 952 504 A2 | 10/1999 |
| JP | 54-1493 | 1/1979 |
| JP | 58-114844 | 8/1983 |
| JP | 61-51212 | 3/1986 |
| JP | 01-213702 | 8/1989 |

OTHER PUBLICATIONS

Japanese Office Action.

* cited by examiner

Primary Examiner—Albert W. Paladini
Assistant Examiner—Zoila Cabrera
(74) Attorney, Agent, or Firm—Staas & Halsey LLP

(57) ABSTRACT

A gear machining controller capable of performing a gear machining of high precision. A gear machining tool and a workpiece are driven by a first motor and a second motor, respectively, to be synchronized with each other, to perform gear machining on the workpiece such as gear cutting and gear finishing. A position amending section is provided at least one of position control loops of servo systems for controlling position/velocity of the first and second motors. The position amendment section obtains amendment amounts based on position deviations and amends a position command of a present processing period by the amendment amount obtained at the processing period preceding by one cycle period of variation of a load torque. An error of synchronization of the first and second motors is reduced so that the gear machining of high precision is performed.

14 Claims, 7 Drawing Sheets

CONTROLLER FOR MACHINING GEARS

BACKGROUND OF THE INVENTION

1. Field of the Invention

The present invention relates to a controller for controlling rotational axes of a machine tool for machining gears, and in particular to a controller for machining gears by a gear generating motion between a workpiece, i.e. a gear blank and a tool having the shape of a gear and being in engagement with the workpiece.

2. Description of Related Art

A gear-generating method has been generally adopted for machining a gear by a gear-generating motion between a workpiece and a tool having the shape of a gear and meshing with a workpiece for machining a gear for gear-cutting and gear-grinding. There are known form cutting and the gear-generating using a hobbing cutter in the gear cutting and there are known polishing, shaving, lapping and honing in gear finishing.

In these gear machining, a driving method is known in which an axis for driving a gear blank (workpiece) and an axis for driving the tool are rotated in accordance with respective motion commands at respective velocities with a predetermined ratio in accordance with specifications of a gear to be generated and the tool, such as modules and the numbers of teeth of the gear and the tool. Another driving method is known in which a motion command for one of servo systems for driving the motors for driving the workpiece and the tool is determined to be a value obtained by multiplying a feedback signal from the other of the motors by a ratio predetermined in accordance with the specifications of the gear to be generated and the tool, so that the two axes are rotated in synchronism.

FIG. 6 is a block diagram of a control system constituted by a conventional controller in which the axes for the workpiece and the tool are driven in synchronism in accordance with respective motion commands. In this example, a tool axis to which a tool 1 is attached is driven by a first motor 15, and a workpiece axis to which a workpiece 2 is attached is driven by a second motor 25.

A servo system for the first motor 15 comprises a position control section 11, a velocity control section 12, a current control section 13 and a current amplifier 14. The first motor 15 is equipped with a position/velocity detector 17 for detecting position and velocity of the first motor 15 and outputs a position feed back amount PFB1 and a velocity feedback amount VFB1. A servo system for the second motor 25 comprises a position control section 21, a velocity control section 22 and a current control section 23 and a current amplifier 24. The second motor 25 is equipped with a position/velocity detector 27 for detecting position and velocity of the second motor 25 and outputs a position feed back amount PFB2 and a velocity feedback amount VFB2.

A position command issued from a host controller such as a numerical controller is directly inputted to the servo system for the first motor 15 for driving the tool 1. On the other hand, the position command issued from the host controller is multiplied by a ratio K in a multiplier term 3 and the obtained product is inputted to the servo system for the second motor 25 for driving the workpiece 2. The ratio K is predetermined in accordance with specifications of a tool and a gear to be formed, such as modules and the numbers of teeth of the tool and the gear.

The position control sections 11 and 21 perform position loop controls by multiplying position deviations between the position commands and the position feedback values PFB1 and PFB2 by position gains, respectively, to obtain velocity commands.

The velocity control sections 12 and 22 perform velocity loop controls such as proportional control and integral control based on velocity deviations between the velocity commands outputted from the position control sections 11 and 21 and the velocity feedback values VFB1 and VFB2, respectively, to obtain current commands.

The current control sections 13 and 23 perform current loop controls based on current deviations between the current commands outputted from the velocity control sections 12 and 22 and the current feedback values CFB1 and CFB2 form current sensors (not shown), respectively, to obtain voltage commands.

The current amplifiers 14 and 24 provide driving currents for the first and second motors 15 and 25 in accordance with the voltage commands outputted from the current control sections 13 and 23, respectively, to drive the first and second motors 15 and 25.

Since the position command for the second motor 25 has a value of the product of the position command for the first motor 15 and the ratio "K", the second motor 25 is driven at a speed having the ratio K with respect to the speed of the first motor 15, to be synchronized with the rotation of the first motor 15, so that the workpiece 2 is driven at a speed having the ratio K with respect to the tool 1 synchronously with the tool 1.

In the example shown in FIG. 6, the position command from the host controller is directly into the servo system for the first motor 15 and the value obtained by multiplying the position command from the host controller by the ratio K is inputted to the servo system for the second motor 25 for driving the workpiece 2. Alternatively, the position command from the host controller is directly into the servo system for the second motor 25 and a value obtained by multiplying the position command by a predetermined ratio may be inputted into the servo system for the first motor 15.

The position control sections 11 and 21, the velocity control sections 12 and 22, and the current control sections 13 and 23 are constituted by digital servo processing by a processor of the controller.

FIG. 7 is a block diagram of a control system constituted by another conventional controller in which a feedback signal of one of the servo systems is multiplied by a predetermined ratio to obtain the position command for the other of the servo systems.

In the arrangement shown in FIG. 7, a position command from the host controller is inputted to the servo system for the first motor 15 for driving the tool 1, and the position feedback amount PFB1 from the position/velocity detector 17 of the fist motor 15 is multiplied by a ratio K and the obtained product is inputted as a position command for the servo system for the second motor 25 for driving the workpiece 2. The ratio K is predetermined in accordance with specifications of the tool and a gear to be generated such as module or the number of teeth of the tool and the gear. The arrangements and functions of the position control sections 11 and 21, the velocity control sections 12 and 22, the current control sections 13 and 23, the current amplifiers 14 and 24, and the position/velocity detectors 17 and 27 as shown in FIG. 7 are the same as those in the control system as shown FIG. 6.

In this example, the first motor for driving the tool 1 is driven based on the position command from the host controller and the second motor 25 is driven based on the position command obtained by multiplying the feedback amount of the first motor 15 by the ratio K, so that the second motor 25 is rotated to follow the rotation of the first motor 15, so that the tool 1 and the workpiece 2 are synchronously driven.

In the above described control systems by the conventional gear machining controllers, precision of machining of gears depends on characteristics of suppressing disturbance of the servo systems for controlling the axes of the tool 1 and the workpiece 2. Therefore, in the case of machining a gear of a large diameter, a disturbance torque (load torque) in machining increases to lower the precision of machining of the gear.

SUMMARY OF THE INVENTION

An object of the present invention is to provide a gear machining controller capable of performing a high-precision machining of a gear.

A gear machining controller of the present invention has servo systems for controlling a first motor for driving a gear machining tool and a second motor for driving a workpiece. The controller comprises: position control means provided in the servo systems for respectively controlling positions of the first motor and the second motor based on position deviations between position commands and position feedback amounts at every processing period; and position amending means provided for at least one of the position control means, for storing amendment amounts based on the position deviations for each cycle period, and amending the position command at a present processing period based on the amendment amount at the processing period preceding by one cycle period. Thereby, an error of synchronism of the first and second motors is reduced to improve precision of machining of gears.

The cycle period may be predetermined to be a period of cycle of a load pattern repeatedly present in driving the first and second motors. Specifically, the cycle period may be predetermined in accordance with a specification of a gear to be machined.

The position amending means may comprise a memory for storing data based on the position deviations for each cycle period, and a dynamic characteristic compensation element for outputting the data stored in the memory at every processing period.

The workpiece and the tool may be driven at a constant ratio based on specifications of the gear to be machined and the tool. One of the first and second motors may be driven in accordance with a position command obtained by multiplying a feedback value of the other of the first and second motors by a constant ratio based on specifications of the gear to be machined and the tool.

DETAILED DESCRIPTION OF THE PREFERRED EMBODIMENTS

In the gear generating motion between a tool and a workpiece by operating motors for driving a tool axis to which the tool is attached and a workpiece axis to which the workpiece is attached in synchronism to perform gear machining such as tooth cutting or tooth finishing, a load torque exerted between the tool and the workpiece varies periodically according to a certain pattern at a constant cycle period. According to the present invention, position amendment is performed at the cycle period, to machining a gear with high precision.

Figure 1:
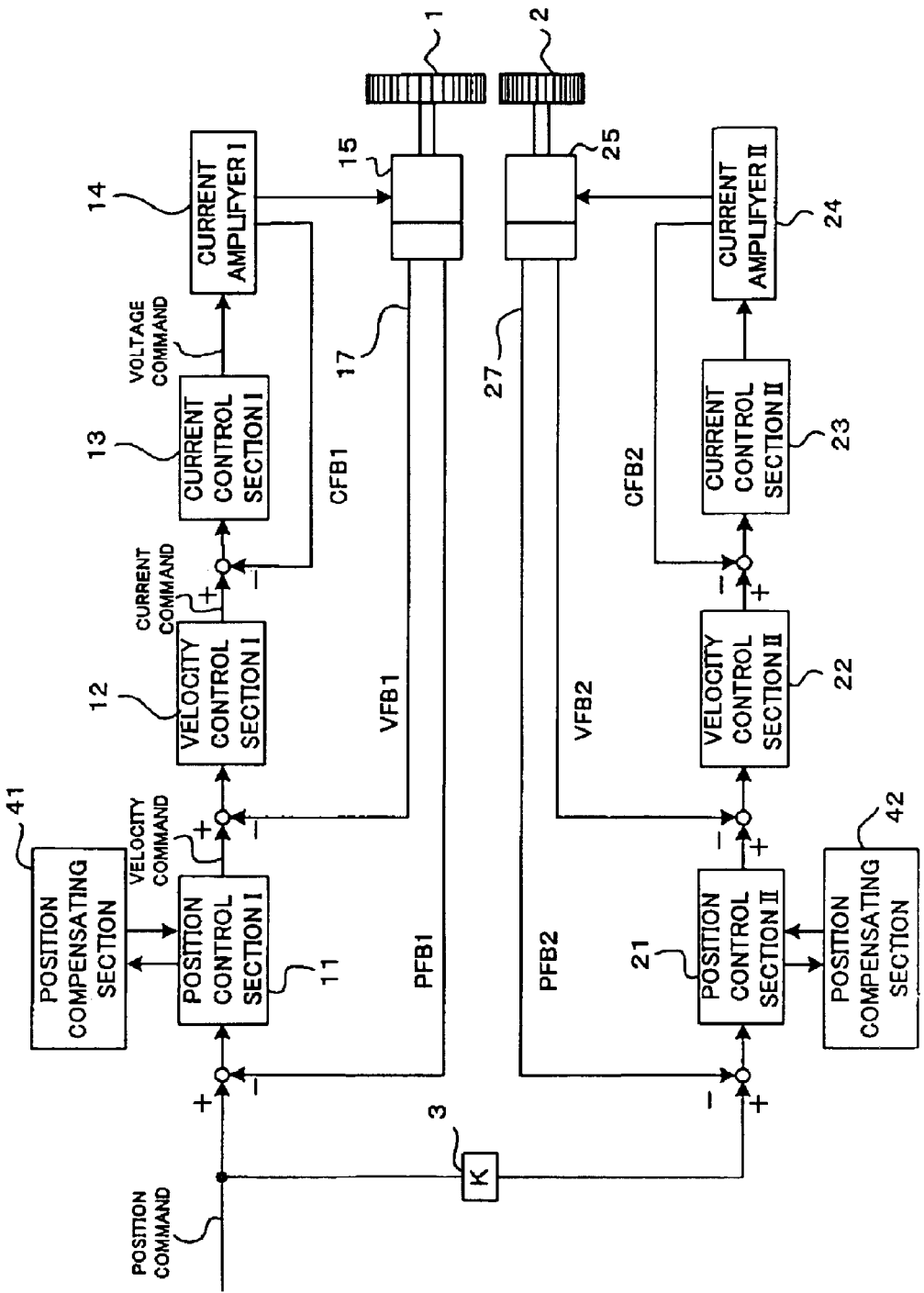
FIG. 1 is a block diagram of a control system in which servo systems for driving a tool and a workpiece operate in accordance with respective position commands, according to an embodiment of the present invention.

FIG. 1 shows a control system in which the tool 1 and the workpiece 2 are driven in accordance with the respective position commands, according to a first embodiment of the present invention. In the control system of this embodiment, position amending sections 41 and 42 are provided at the position control sections 11 and 21, respectively. The loop processing by the position control sections 11 and 21, the velocity control sections 12 and 22, and the current control sections 13 and 23 are performed by digital servo processing by a processor of the controller, and the processing of the position amending sections 41 and 42 are also performed by digital processing by the processor.

The position command issued from the host controller is inputted to the servo system for the first motor 15 for driving the tool 1. The position command from the host controller is multiplied by a ratio K and the obtained product is inputted to the servo system for the second motor 25 for driving the workpiece 2. Position deviations between the position commands and the position feedback amounts PFB1 and PFB2 are inputted to the position control sections 11 and 22, respectively, and the position deviations are amended based on amendment data obtained at the processing period preceding one cycle period of a load pattern by the position amending sections 41 and 42, respectively. Thereby, the position commands are substantially amended by the amendment of the position deviations by the position amending sections 41 and 42. The amended position deviations are multiplied by the position gains to obtain velocity commands by the position control sections 11 and 21, respectively. The velocity control sections 12 and 22 perform velocity controls based on the velocity commands from the position control sections 11 and 21 to obtain current commands. The current controls are performed based on the current commands from the velocity control sections 12 and 22 to drivingly control the servomotors 15 and 25 through the current amplifiers 14 and 24, respectively.

The ratio K is predetermined in accordance with specifications of a tool and a gear to be machined such as modules and the numbers of teeth of the tool and the gear. The position command issued from the host processor may be directly inputted into the servo system for the second motor 25, and the value obtained by multiplying the position command from the host processor by the ratio K may be inputted into the servo system for the first motor 15.

In the embodiment as shown in FIG. 1, the two position amending sections 11 and 21 are provided for the position control sections 11 and 21, respectively. Alternatively, only one position amending section may be provided for one of the position control sections 11 and 21.

Figure 2:
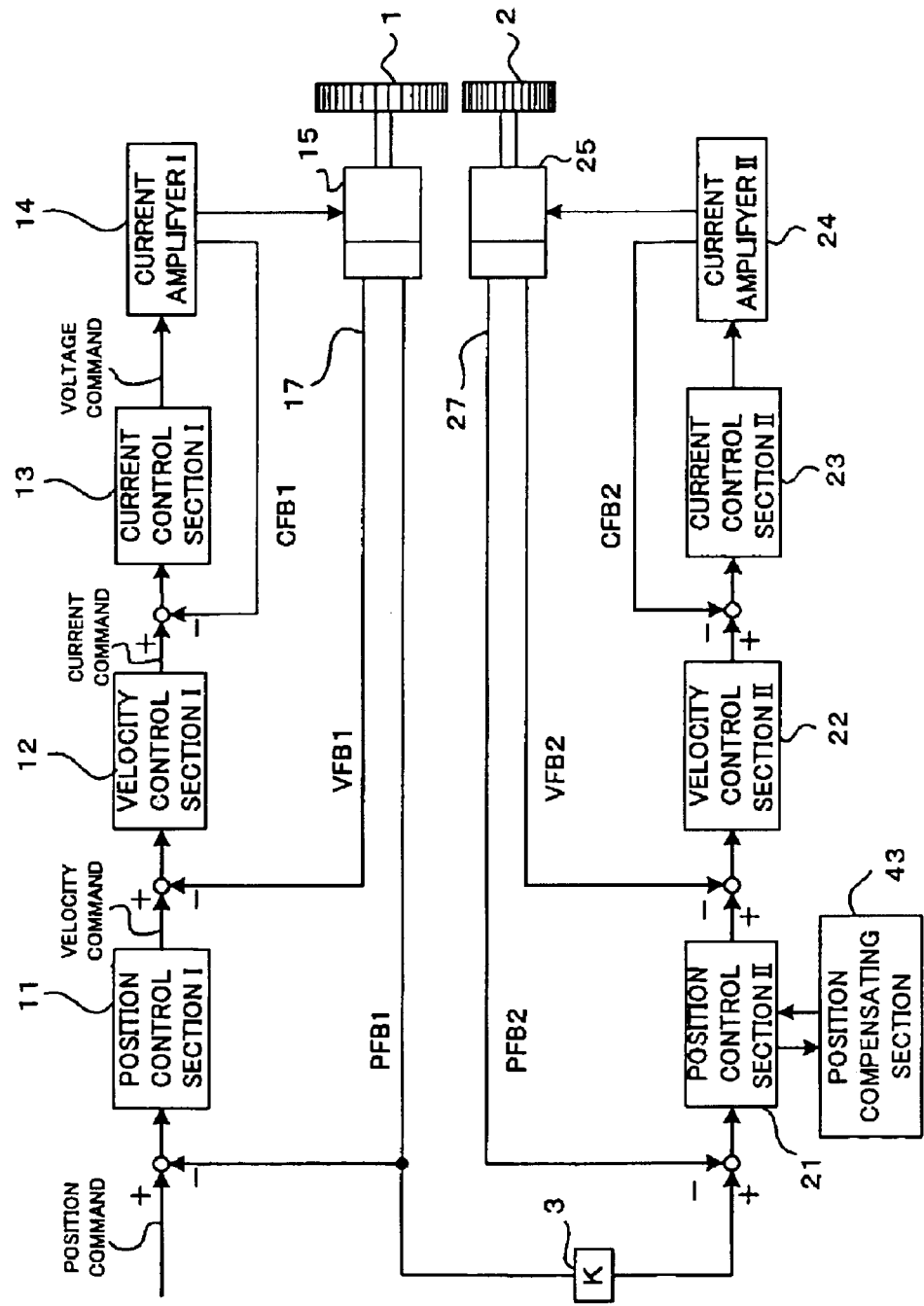
FIG. 2 is a block diagram of a control system in which one of the servo systems for driving the tool and the workpiece is controlled based on a feedback signal in the other of the control systems, according to another embodiment of the present invention.

FIG. 2 shows a control system in which the position feedback signal of one of the servo systems is used for synchronization of the rotations of the tool and the workpiece for machining of a gear, according to a second embodiment of the present invention.

In this example shown in FIG. 2, the position feedback signal PFB1 from the position/velocity detector 17 attached to the first motor 15 for driving the tool 1 is multiplied by the ratio K and the obtained product is inputted to the servo system for the second motor 25 for driving the workpiece 2 as a position command for the second servo system. Alternatively, the position command from the host controller may be inputted into the second servo system for the second motor 25 for driving the workpiece 2 and the feedback amount PFB2 from the position/velocity detector 27 of the second motor 25 may be multiplied by the ratio K to obtain a position command of the first servo system for the first motor 15.

In this embodiment, a position amending section 43 is provided for the position control section 21 in the second servo system for the second motor 25. Alternatively, the position amending section may be provided for the position control section 11 in the first servo system for the first motor 15 for driving the tool 1. Further, two position amending sections may be provided for the position control sections 11 and 21, respectively.

Figure 3:
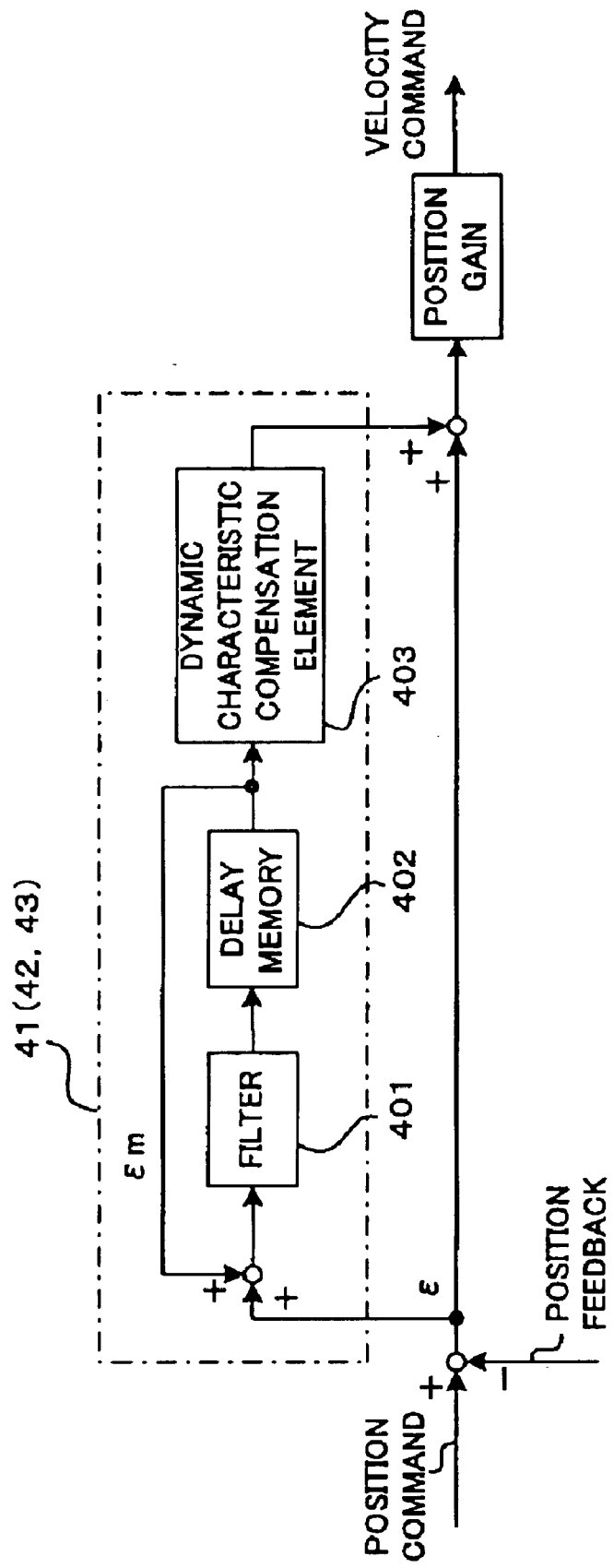
FIG. 3 is a detailed block diagram of the position amending section provided in the servo system.

FIG. 3 shows details of each of the position amending section 41, 42 and 43, which is constituted by a repetitive controller. The repetitive controller constituting each of the position amending sections 41, 42 and 43 comprises a filter 401, a delay memory 402 for storing position deviation data in one cycle period M, and a dynamic characteristic compensation element 403 for compensating a phase delay of the controlled object and a reduction of the gain. The cycle period M may is determined to be a time period at which a certain pattern of variation of the load torque is repeatedly present, such as a time period in which the workpiece 2 performs one revolution, a time period for the tool 1 to perform one revolution, and further a time period obtained by dividing the time period of one revolution of the tool 1 by the number of teeth of the tool 1.

The processor for performing the digital servo processing of the position control sections 11 and 21, the velocity control sections 12 and 22, the current control sections 13 and 23 of the respective servo systems performs the processing of each of the repetitive controllers 41, 42 and 43.

The position deviation ε is sampled at every sampling period of the position/velocity processing period "t" and the data εm at the sampling period preceding one cycle period M which is outputted from the delay memory 402 is added to the position deviation ε and the sum is subjected to the processing of the filter 401, and the obtained data are stored in the delay memory 402. The delay memory 402 has "Q"(=M/t) number of memory areas for storing the obtained data in the cycle period M, and the oldest data is outputted at each sampling period. In particular, the stored data are shifted by one address and the inputted data is stored at an address number "0" and the data stored at the address number "Q-1" is outputted at every sampling period. As a result, the stored data delayed by one cycle period M is outputted from the delay memory 402. Then, the position deviation ε and the output εm of the delay memory 402 are summed up, so that the data representing the accumulated sum of the position deviations in one cycle period M are stored in the delay memory 402.

The phase delay of the controlled object (motor) and the reduction of the gain in the output of the delay memory 402 is compensated by the dynamic characteristic compensation element 403 and the compensated value is outputted as the position amendment data from each of the position amending sections 41, 42 and 43. The amendment data are added to the position deviation ε and the sum is multiplied by the position gain to form the velocity command. It should be noted that the addition of the amendment data to the position deviation is equivalent to that the position command for the servo system is amended by adding the amendment data.

With the above arrangement, the processing for the same load pattern at the cycle period M is repeatedly executed at every sampling period such that the amendment data of large value is outputted at each sampling period from each of the repetitive controllers 41, 42 and 43 when the position deviations ε at the sampling periods preceding by cycle periods M has a great value, so that the velocity command as the output of the position loop is made larger to increase the actual velocity of the motor, thereby the position deviation ε is promptly converged to zero, to realize motor control of high precision.

The principle and function of the repetitive controller are described in detail in JP 2-307104A, JP 2840139B, etc., the disclosures of which are incorporated by reference.

FIGS. 4a, 4b and 5a, 5b show results of simulations for verifying effects of the present invention. In FIGS. 4a, 4b and 5a, 5b, an axis of ordinate represents time and an axis of abscissa represents an error of synchronism indicating a difference between the position deviations of the respective axes, i.e. the difference between the position deviation in the servo system for the motor for driving the tool 1 and the position deviation in the servo system for the motor for driving the workpiece 2. The simulations were performed on the conditions that rotational speed of the tool 1 is 187.5 $min^{-1}$, the number of teeth of the tool 1 is 17, the number of teeth of the workpiece is 45, and a machining load corresponding to a cutting load of an appropriate value is exerted in the form of a rectangular wave and the cycle period M of the load pattern is set to a period of one revolution of the tool 1.

Figure 4A:
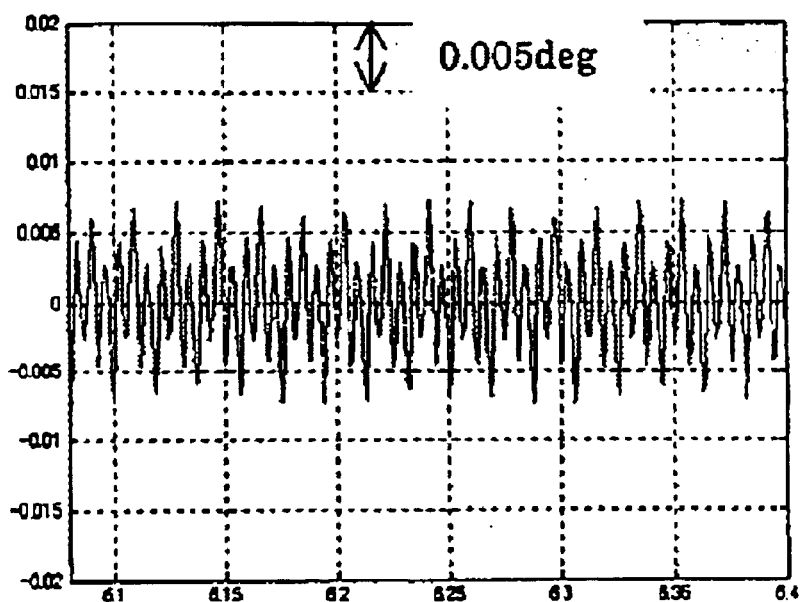
FIGS. 4a and 4b are graphs showing simulation results of operations of the control system according to the conventional controller and the control system according to controller of the present invention, in which the tool and the workpiece are driven in accordance with respective position commands.
Figure 4B:
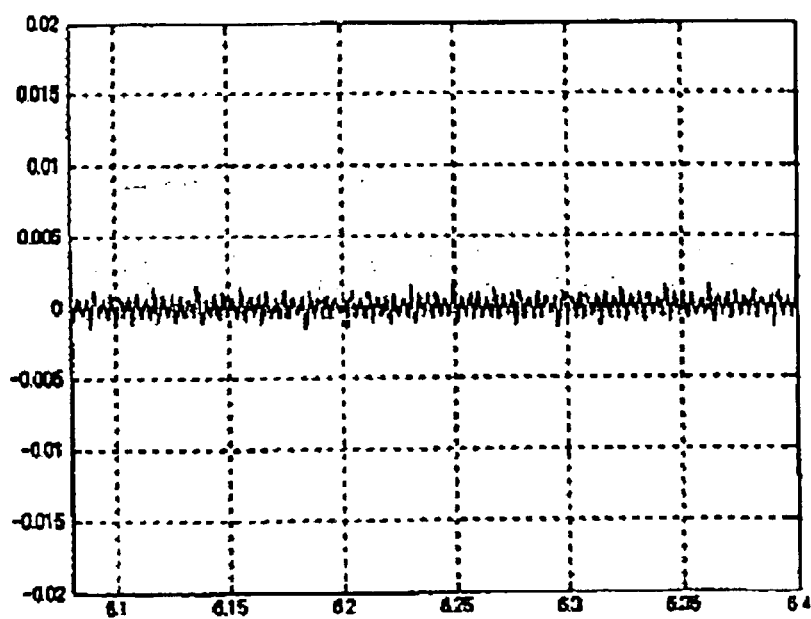
Figure 6:
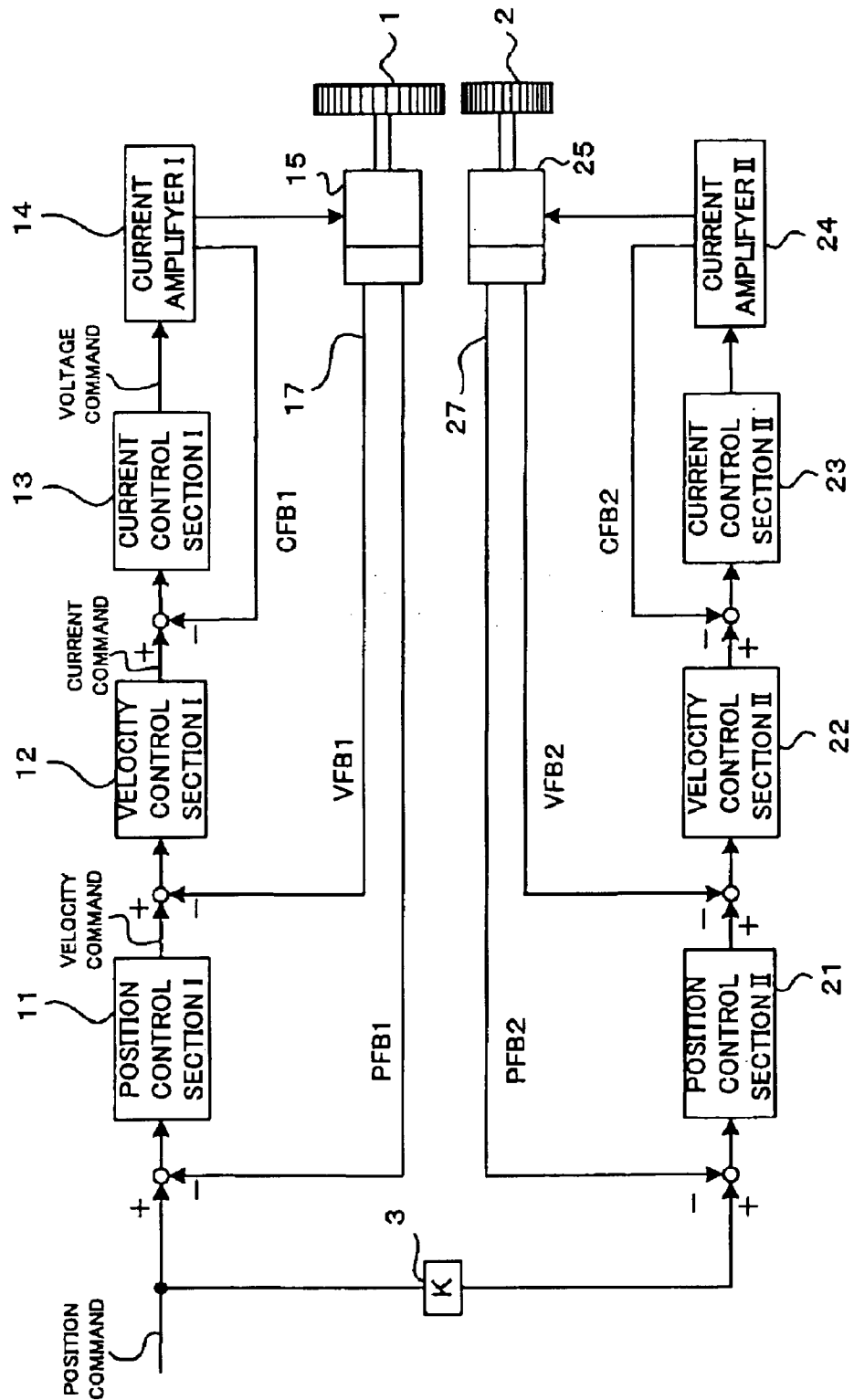
FIG. 6 is a block diagram of a control system in which servo systems for driving a tool and a workpiece operate in accordance with respective position commands, according to a conventional controller.

FIG. 4a shows a simulation result of machining according to the conventional control system in which the first motor 15 for driving the tool 1 and the second motor 25 for driving the workpiece 2 are driven in accordance with the respective position commands as shown in FIG. 6, and FIG. 4b shows a result of machining according to the control system of the present invention with the position amending sections 41 and 42 as shown in FIG. 1. As can be seen from comparison of the simulation results shown in FIG. 4a and FIG. 4b, the error of synchronism in the control system of the present invention is smaller than that of the conventional control system, to improve the machining precision.

Figure 5A:
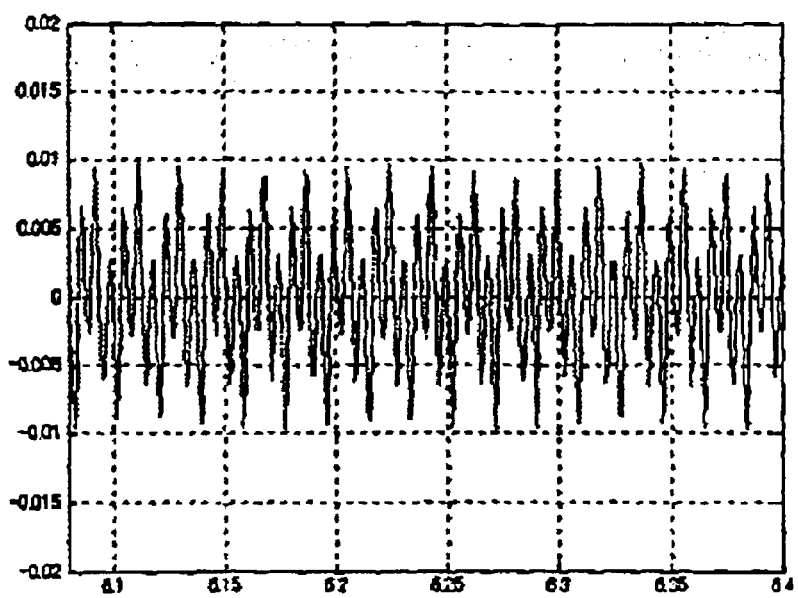
FIGS. 5a and 5b are graphs showing simulation results of operations of control system according to the conventional controller and the control system according to the controller of the present invention, in which the feedback signals of one of the servo systems for the tool and the workpiece is used for the other of the servo systems.
Figure 5B:
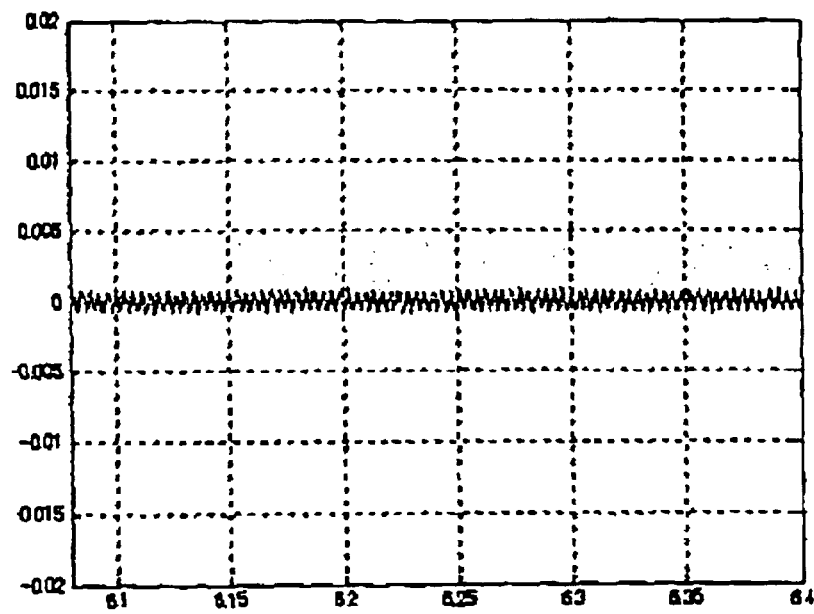
Figure 7:
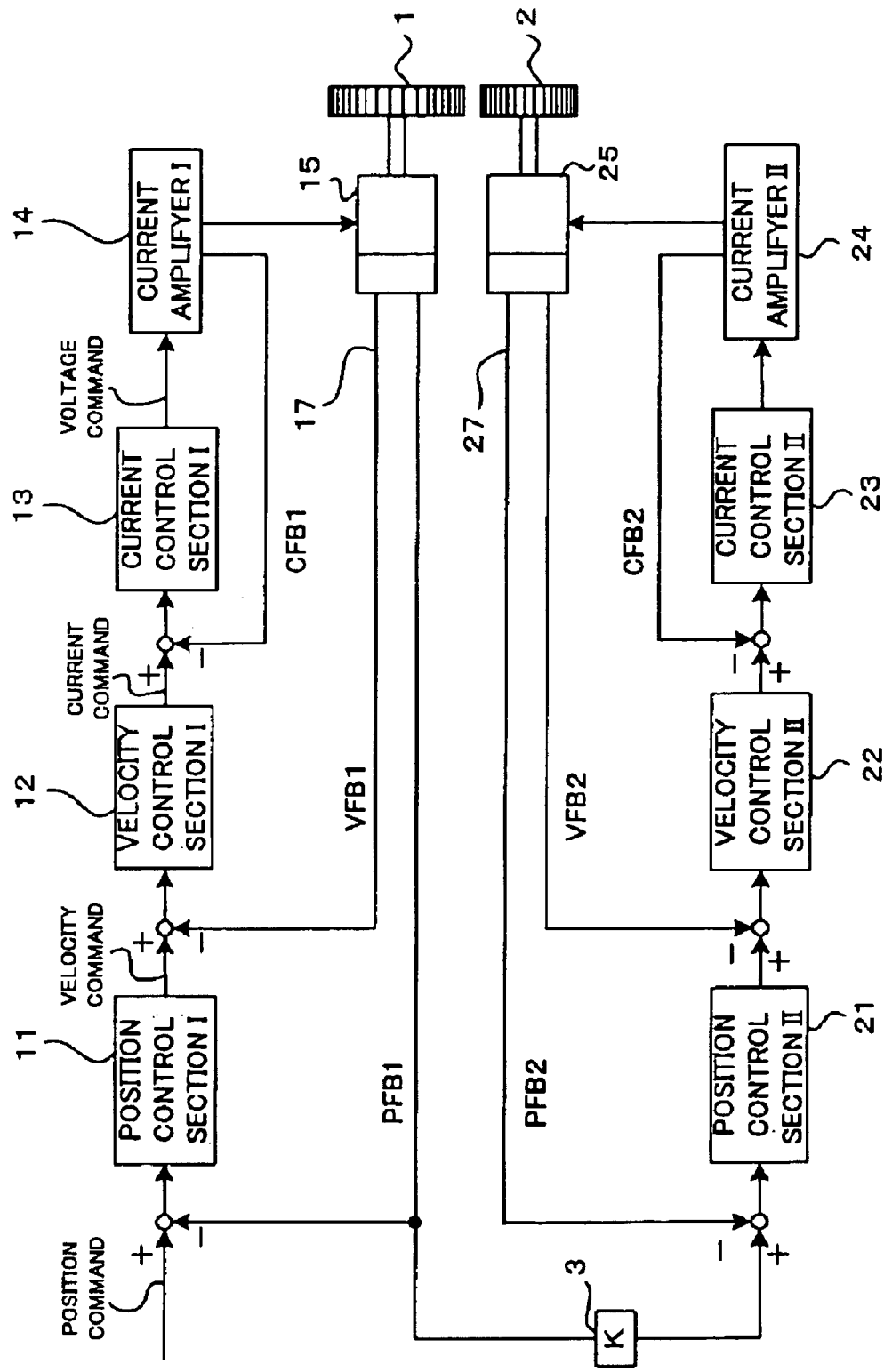
FIG. 7 is a block diagram of a control system in which one of the servo systems for driving the tool and the workpiece operates based on a feedback signal in the other servo system, according to another conventional controller.

FIG. 5a shows a simulation result of machining according to the conventional control system as shown in FIG. 7, and FIG. 5b shows a simulation result of machining according to the control system of the present invention with the position amending section 43, as shown in FIG. 2. In this case also, the error of synchronism in the control system of the present invention is smaller than that in the conventional control system, to improve the machining precision. As described, according to the present invention, the error of synchronism is reduced so that machining of gears of high precision is performed.

What is claimed is:

1. A gear machining controller having servo systems controlling a first motor for driving a gear machining tool and a second motor driving a workpiece, said controller comprising:

first position control means and second position control means provided in the servo systems for respectively controlling positions of the first motor and the second motors, based on position deviations between position commands and position feedback amounts at every processing period; and position amending means provided for at least one of said position control means, for storing amendment amounts, based on the position deviations for each cycle periods, comprising a period of a cycle of a load pattern repeatedly present in driving the first motor and the second motor to machine the workpiece, and amending the position command at a present processing period based on the amendment amount at the processing period preceding by one cycle period.

2. The gear machining controller according to claim 1, wherein said cycle period is predetermined in accordance with a specification of a gear to be machined.

3. The gear machining controller according to claim 1, wherein said position amending means comprises a memory for storing data based on the position deviations for each cycle period, and a dynamic characteristic compensation element for outputting the data stored in said memory at every processing period.

4. The gear machining controller according to claim 1, wherein the workpiece and the tool are driven at a constant ratio based on specifications of the gear to be machined and the tool.

5. The gear machining controller according to claim 1, wherein one of said first and second motors is driven in accordance with a position command obtained by multiplying a feedback value of the other of said first and second motors by a constant ratio based on specifications of the gear to be machined and the tool.

6. A gear machining controller, comprising:

a first position controller controlling positions of a first motor driving a gear machine tool according to received position commands and position feedback signals;

a second position controller controlling positions of a second motor driving a workpiece, according to received position commands and position feedback signals; and a position amender determining amendment data based on differences between the position commands and the position feedback signals obtained in a preceding predetermined cycle, and amending the position commands in a current predetermined cycle based on the amendment data.

7. The gear machining controller according to claim 6, wherein the position amender comprises a repetitive controller.

8. The gear machining controller according to claim 7, wherein the repetitive controller comprises:

a memory storing the amendment data for each predetermined cycle; and a dynamic characteristic compensator controlling a phase delay and gain reduction of the amendment data.

9. The gear machining controller according to claim 8, wherein one of the first and second motors is driven in accordance with a position command obtained by multiplying a feedback value of the other of the first and second motors by a constant ratio based on specifications of the workpiece to be machined and the gear machining tool.

10. The gear machining controller according to claim 8, wherein the predetermined cycle is a time period at which a load pattern is repeatedly present in driving the first and second motors.

11. The gear machining controller according to claim 8, wherein the predetermined cycle is based on a time period determined by the number of teeth of the gear machining tool.

12. A gear machining controller, comprising:

a first motor driving a gear machining tool responsive to first position control signals;

a first position compensator which accumulates an amendment sum of position deviation amounts, which are a difference between position commands and position feedback amounts, for a predetermined cycle;

a first position controller outputting first position control signals controlling the position of the gear machining tool based on the accumulated amendment sum and a current position deviation;

a second motor driving a workpiece responsive to second position control signals;

a second position compensator which accumulates an amendment sum of position deviation amounts for the predetermined cycle and the amendment sum is added to the current position deviation amount to adjust the position of the workpiece; and a second position controller controlling the position of a workpiece driven by a second motor based on compensated position deviations.

13. The gear machining controller according to claim 12, wherein the predetermined cycle is a time period at which a load pattern is repeatedly present in driving the first and second motors.

14. The gear machining controller according to claim 12, wherein the predetermined cycle is based on a time period determined by the number of teeth of the gear machining tool.

* * * * *

UNITED STATES PATENT AND TRADEMARK OFFICE
CERTIFICATE OF CORRECTION

PATENT NO. : 6,823,235 B2
DATED : November 23, 2004
INVENTOR(S) : Yukio Toyozawa et al.

It is certified that error appears in the above-identified patent and that said Letters Patent is hereby corrected as shown below:

Column 2,
Line 52, change "fist" to -- first --.

Column 5,
Line 48, delete "may".

Column 7,
Line 18, change "motors" to -- motor --.
Line 24, change "periods" to -- period --.

Signed and Sealed this

Twenty-eighth Day of June, 2005

JON W. DUDAS
*Director of the United States Patent and Trademark Office*